United States Patent
Hammer

(10) Patent No.: US 12,146,551 B2
(45) Date of Patent: Nov. 19, 2024

(54) LINEAR ADJUSTER, POSITIONING DEVICE, POSITIONING ASSEMBLY AND METHOD FOR REPAIRING A LINEAR ADJUSTER

(71) Applicant: PHYSIK INSTRUMENTE (PI) GMBH & CO. KG, Karlsruhe (DE)

(72) Inventor: Simon Hammer, Niederlauterbach (FR)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 0 days.

(21) Appl. No.: 17/920,283

(22) PCT Filed: Apr. 20, 2021

(86) PCT No.: PCT/EP2021/060222
§ 371 (c)(1),
(2) Date: Oct. 20, 2022

(87) PCT Pub. No.: WO2021/214046
PCT Pub. Date: Oct. 28, 2021

(65) Prior Publication Data
US 2023/0167885 A1    Jun. 1, 2023

(30) Foreign Application Priority Data

Apr. 20, 2020   (DE) .................... 102020110697.1

(51) Int. Cl.
*F16H 25/24*   (2006.01)
*F16H 25/20*   (2006.01)

(52) U.S. Cl.
CPC ..... *F16H 25/2015* (2013.01); *F16H 25/2454* (2013.01); *F16H 2025/2075* (2013.01)

(58) Field of Classification Search
CPC .................... F16H 25/2015; F16H 25/2454
See application file for complete search history.

(56) References Cited

U.S. PATENT DOCUMENTS

| 2,497,424 A | | 2/1950 | Terdina et al. |
| 5,088,339 A | * | 2/1992 | Lochmoeller ....... F16H 25/2015 |
| | | | 74/89.37 |

(Continued)

FOREIGN PATENT DOCUMENTS

| DE | 10001939 A1 | 7/2000 |
| DE | 102004007550 A1 | 9/2005 |

(Continued)

OTHER PUBLICATIONS

Int'l Preliminary Report on Patentability (IPRP) for PCT /EP2021/060222, dated Jun. 28, 2021 (9 pages).

(Continued)

*Primary Examiner* — Randell J Krug
(74) *Attorney, Agent, or Firm* — The Juhasz Law Firm

(57) ABSTRACT

Disclosed is a linear adjuster, comprising: a spindle-and-spindle-nut mechanism, a first adjustment part, and a second adjustment part. The first adjustment part comprises a first main body and a first stop device. The second adjustment part comprises a second main body and a second stop device. The first adjustment part and the second adjustment part may be moved relative to each other by means of the spindle-and-spindle-nut mechanism which comprises a spindle longitudinal axis (L3). The first stop device and the second stop device come to a stop state when the linear adjuster performs a retraction travel movement or an extension travel movement and the first adjustment part and the second adjustment part are in a predefined stop travel position relative to each other. A positioning device, a positioning assembly and a method for repairing a linear adjuster.

17 Claims, 8 Drawing Sheets

(56) References Cited

U.S. PATENT DOCUMENTS

Figure 3:
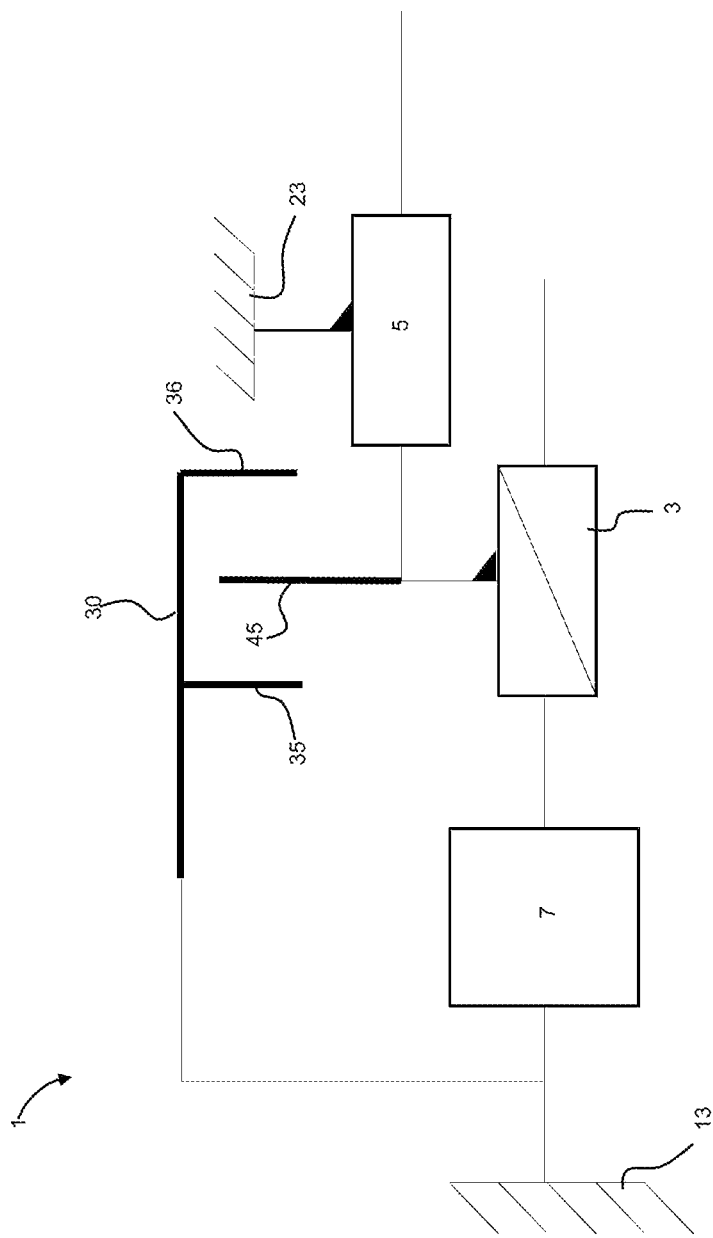

| | | | |
|---|---|---|---|
| 6,116,104 A * | 9/2000 | Nagai | B23Q 1/26 |
| | | | 74/89.32 |
| 2002/0074866 A1 | 6/2002 | Morishima et al. | |
| 2020/0325968 A1* | 10/2020 | Carlson | B60P 3/34 |
| 2021/0222759 A1* | 7/2021 | Bonkowski | B62D 5/001 |

FOREIGN PATENT DOCUMENTS

| | | |
|---|---|---|
| DE | 102007016529 A1 | 10/2008 |
| DE | 102008012001 A1 | 9/2009 |
| DE | 102005025748 B4 | 7/2011 |
| DE | 102016006234 A1 | 11/2017 |
| EP | 1898122 A2 | 3/2008 |
| EP | 2202870 A2 | 6/2010 |
| FR | 2866020 A1 | 8/2005 |

OTHER PUBLICATIONS

Int'l Search Report (Translation) for PCT /EP202 I/060222, dated Jun. 28, 2021 (2 pages).
German Office Action dated Mar. 15, 2021.
EU Office Action dated Nov. 10, 2023.

* cited by examiner

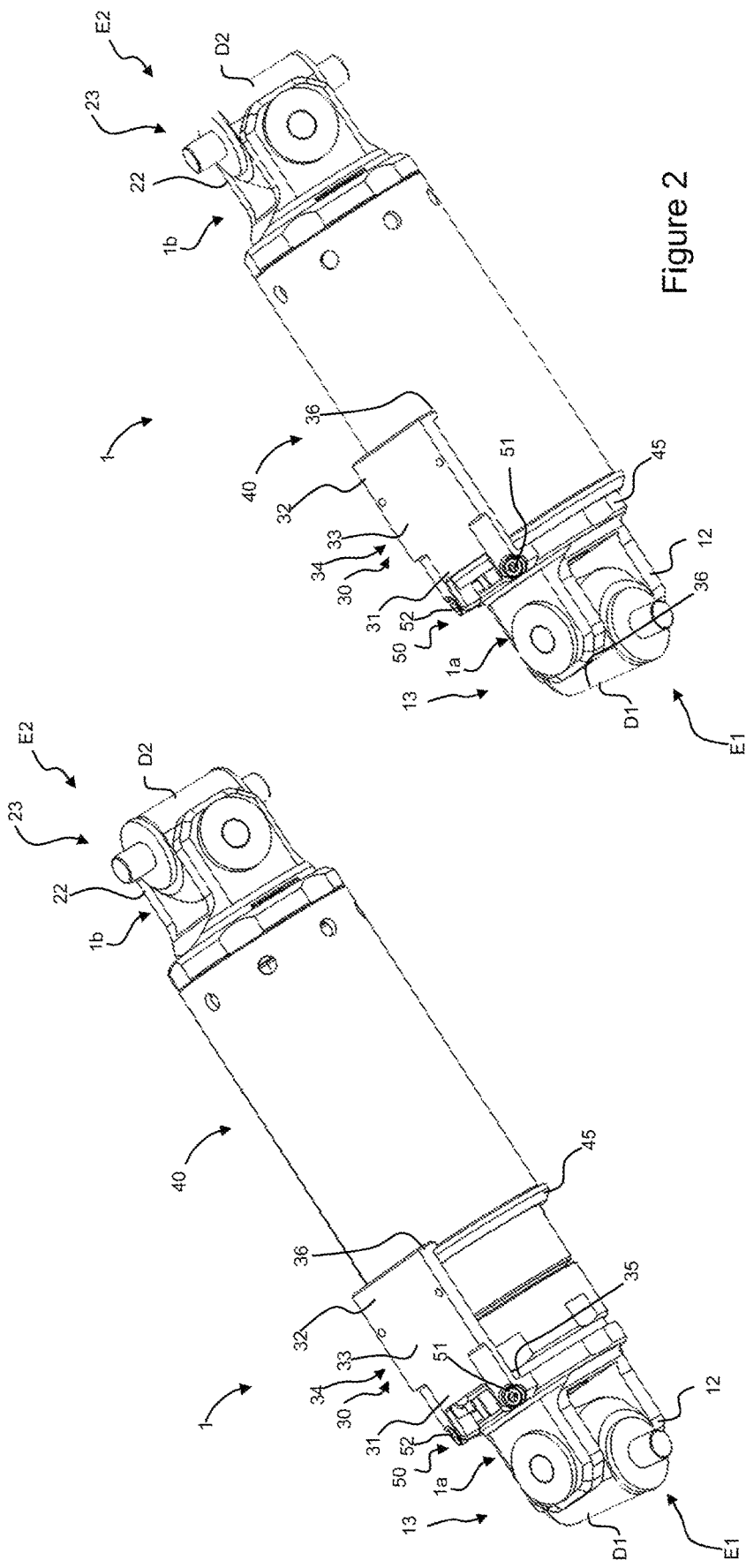

LINEAR ADJUSTER, POSITIONING DEVICE, POSITIONING ASSEMBLY AND METHOD FOR REPAIRING A LINEAR ADJUSTER

The invention relates to a linear adjuster, a positioning device, a positioning assembly and a method for repairing a linear adjuster.

A drive for a spindle drive with a stop device is known from DE 10 2004 007 550 A1.

EP 1 898 122 A2 describes an adjusting device for a linear adjuster.

U.S. Pat. No. 2,097,424 discloses a stop device for a linear adjuster.

DE 10 001 939 A1 describes an adjusting device for positioning a lens in a projector. The adjusting device comprises a lens support frame and a lens receiving frame for receiving a lens. The lens receiving frame is adjustable relative to the lens support frame within certain limits in mutually opposite linear adjustment directions. Additionally, an anti-lock nut is rotatably guided on the one hand via fine threads on a drive spindle and on the other hand via coarse threads in a frame bore of a shaping of the lens receiving frame. Two stops of a clamp, to which the anti-lock nut can be brought into abutment by a movement defined by the coarse thread, protrude into the thread of the shaping. In this state, the anti-lock nut, driven via the fine thread, moves the clamp and thereby the lens receiving frame in a respective actuating direction until the lens receiving frame comes into a stop state with one of the end stops of the lens supporting frame. By means of the coarse thread, blocking of the anti-lock nut is prevented in the case of the adjusting movements.

An object of the invention is to provide a linear adjuster which is advantageous with regard to reliable operation.

According to the invention, a linear adjuster is provided, which comprises: a spindle-and-spindle-nut mechanism, a first adjustment part which comprises a first main body at a first end of the linear adjuster and a first stop device, and a second adjustment part which comprises a second main body at a second end of the linear adjuster and a second stop device, wherein the first end and the second end are situated opposite one another, wherein the first adjustment part and the second adjustment part can be moved relative to one another by means of the spindle-and-spindle-nut mechanism with a spindle longitudinal axis. The first adjustment part and the second adjustment part are realized in such a way that the first stop device and the second stop device come into a stop state, in which the first stop device and the second stop device are in contact with one another with mutually facing surfaces, when the first stop device and the second stop device are in a stop provisioning state and the linear adjuster executes a retraction movement with a reduction of an adjustment length or an extension movement with an increase in the adjustment length, and the first adjustment part and the second adjustment part are located in a predetermined respective stop travel position relative to one another. According to the embodiments of the linear adjuster according to the invention, the stop state is defined in particular by the fact that in this the first stop device and the second stop device are in contact with one another with mutually facing surfaces.

For this purpose, the linear adjuster comprises a fixation device, which can assume a stop provisioning state and a stop release state, wherein the stop release state is set by releasing the mechanical fixation of the fixation device. In the stop provisioning state, the first stop device is mechanically fixed to the first main body or the second stop device is mechanically fixed to the second main body. In a corresponding embodiment of the linear adjuster, the stop state occurs during the retraction movement or during the extension movement. According to an embodiment of the linear adjuster according to the invention, the linear adjuster is in the stop release state after release of the mechanical fixing of the fixation device, in which the adjustment parts may be moved from the stop travel position with the spindle-and-spindle-nut mechanism relative to one another in the retraction movement or the extension movement or, alternatively thereto, relative to one another in the retraction movement and the extension movement.

Embodiments of the linear adjuster according to the invention may be realized in such a way that, in the event that the stop state comes about during a retraction movement with a reduction of the adjustment length, in the stop provisioning state, from the stop travel position existing therein, a further retraction movement is mechanically prevented and a further retraction movement is no more possible, and mechanically, in particular by a stop part, is blocked. Alternatively or additionally, the embodiments of the linear adjuster according to the invention may be realized in such a way that, in the event that the stop state comes about during an extension movement with an increase in the adjustment length, in the stop provisioning state, from the stop travel position existing therein, a further extension is mechanically prevented and a further retraction movement is no more possible and is blocked mechanically, in particular by a stop part.

The embodiments of the linear adjuster according to the invention may be realized in such a way that the release of the mechanical fixing of the fixation device is defined by the following alternatives (F1), (F2), (F3), wherein, for the description of the invention, the first main body or the second main body is defined as the first fixation component and a fixation component which is associated to the first fixation component is defined as the second fixation component, wherein—in case that the first fixation component is the first main body—the second fixation component is the first stop device or—in case that the first fixation component is the second main body—the second fixation component is the second stop device, provided in an embodiment the respective first fixation component and the respective second fixation component form a stop provisioning state:

(F1) mechanical decoupling of the first fixation component and the second fixation component, wherein a mechanical connection, in particular a connection between the first and the second fixation component remains, wherein this connection may be realized by a pivot joint or a linear guide;

(F2) establishing a free mobility of the second fixation component relative to the first fixation component, in which there is no mechanical contact between the second fixation component relative to the first fixation component exists and the second fixation component is freely movable relative to the first fixation component;

(F3) deformation of the second fixation component relative to the first fixing component, e.g. plastic or elastic deformation of the second fixation component, in case that the second fixation component is formed from a plastically deformable material or elastically deformable material.

When implementing the alternative (F1) with the pivot joint, an axially laterally pivotable section of the second fixation component is mechanically released for a movement with respect to the spindle axis radially outward into the stop release state and is moved radially outward. When implementing the alternative (F2), the second fixation component may be removed radially outward with respect to the spindle axis. In an implementation, the release of the second fixation component may already be provided by releasing the fixing. In one implementation, the release of the second fixation component may also be provided only after additional removal of at least one section of the same. When implementing the alternative (F3), a deformation portion of the second fixation component is moved radially outward with respect to the spindle axis.

In the embodiments of the linear adjuster according to the invention, the linear adjuster may in particular be realized in such a way that one or both of the following events (A1), (A2) occur in the stop provisioning state, in which the second fixation component is arranged on the first fixation component and relative thereto in a mechanically fastened or locked manner in which the position and the orientation is fixed:
  (A1) the linear adjuster comes into a first stop state in the event of a retraction movement with a reduction of the adjuster length in a minimum adjustment length stop state between the first and second adjustment parts;
  (A2) the linear adjuster comes into a second stop state in the event of an extension movement with an increase in the adjuster length in a minimum adjustment length stop state between the first and second adjustment parts.

According to the invention, the first stop device is arranged on the first main body or the second stop device is arranged on the second main body, in particular in the stop provisioning state, in a fixed manner in terms of position and orientation, and particularly is mounted and in this case particularly is fastened by mean of a respective fixation device. According to the invention, the linear adjuster is realized in such a way that one or both of the following measures (B1), (B2) can be executed with the linear adjuster:
  (B1) by moving the first stop device with respect to the first main body into a stop release state, the stop state between the first adjustment part and the second adjustment part is released, so that the same is no longer present, wherein it may be provided that the first adjustment part, relative to the second adjustment part, may execute a further retraction movement if the event (A1) is present, or may execute a further extension movement if the event (A2) is present;
  (B2) by moving the second stop device with respect to the second main body into a stop release state, the stop state between the first adjustment part and the second adjustment part is released, so that the same is no longer present, wherein it may be provided that the first adjustment part, relative to the second adjustment part, can execute a further retraction movement if the event (A1) is present, or can execute a further extension movement if the event (A2) is present.

According to one embodiment of the invention, the second fixation component is arranged at least in sections or completely outside the first fixation component, so that the second fixation component is accessible from the outside and further can be actuated manually and in particular with a tool from the outside, i.e. that the second fixation component can be brought or moved from the provisioning state into the stop release state by manual action.

Each embodiment of the invention may be configured such that the transition from the stop provisioning state between the second fixation component and the first fixation component to the stop release state takes place by moving the second fixation component or at least a portion thereof with respect to the spindle axis, wherein the linear adjuster may be embodied according to one or more of the following alternatives (C1), (C2):
  (C1) In the stop provisioning state, the respective second fixation component is fastened to the first fixing component by means of a fastening device, in particular by means of at least one mechanically adjustable connection element, wherein a stop device support of the respective second fixation component is connected to a main body support of the respective first fixation component and by means of connection element in a tightened or locked state is held in a state which braces the first and the second fixation component, and wherein by changing the position of the connection element into a mobility state, in which the same braces the stop device support and the main body support less or no longer in such a way that the second fixation component may be moved into the stop release state, in particular with a relatively low expenditure of force, wherein this movement into the stop release state takes place by pivoting or displacing the second fixation component relative to the first fixation component or by releasing the mechanical connection between the second fixation component and the first fixation component and optionally only by additionally removing the second fixation component from the first fixation component.
  (C2) In the stop-provisioning state, the respective second fixation component is clamped by means of a clamping device on the first fixation component, for example by means of a form-fitting connection, wherein a stop device support of the respective second fixation component is connected to a clamping device on a main body support of the respective first fixation component, and wherein by overcoming the clamping between the second fixation component and the first fixation component, a movement of the second fixation component into the stop release state takes place, in particular by pivoting or displacing the second fixation component relative to the first fixation component or by releasing the mechanical connection between the second fixation component and the first fixation component and optionally only by additionally removing the second fixation component from the first fixation component.

Here, a release of the mechanical connection between the second fixation component and the first fixation component may mean, in particular, that the second fixation component may be separated from the first fixation component with little effort and in particular manual effort and may be removed from the range of movement of the first fixation component.

Embodiments of the linear adjuster according to the invention may be realized in such a way that, in the stop provisioning state, the second fixation component is arranged on the first fixing component by means of the fixation device in a mechanically fixed or fastened manner in which the position and the orientation is fixed. In order to achieve the stop release state, the fixation device is released and the second fixation component is mechanically released for a movement from the first fixation component in relation to the spindle axis radially outward into the stop release state.

Embodiments of the linear adjuster according to the invention may be realized in such a way that the second fixation component and, for example, the first stop device comprises a first spacer piece and at least one mobile stop part, wherein the first spacer piece protrudes from the first fixation component and, for example, from the first main body in the direction of the spindle longitudinal axis toward the second end, and the first spacer piece comprises a proximal end section, a distal end portion and a connection piece which connects the same, and wherein the second fixation component and, for example, the first stop device is implemented in one or both of the following alternatives:

(m) at the proximal end portion, a proximal mobile stop part is formed, which extends radially from the first stop device with respect to the spindle longitudinal axis, (n) at the distal end portion, a distal mobile stop part is formed, which extends radially from the first stop device with respect to the spindle longitudinal axis.

Embodiments of the linear adjuster according to the invention may be realized such that the second fixation component and, for example, the first stop device are shaped like a clamp, a bridge or an arc.

Embodiments of the linear adjuster according to the invention may be realized in such a way that the fixation device is formed on the proximal end section.

Embodiments of the linear adjuster according to the invention may comprise a first main body as a first fixing component and a first stop device as a second fixation component, wherein a second stop device which is arranged on the second main body comprises a second spacer piece and a complementary stop part, wherein the second spacer piece protrudes from the second main body toward the first end in the direction of the spindle longitudinal axis, and the second spacer piece comprises a connection section, which is connected to the second main body in a rotationally fixed manner, a stop section and a connection piece which connects the same.

These embodiments may be realized such that the complementary stop part is arranged on the stop section and extends radially outward from the stop section with respect to the spindle longitudinal axis, wherein, in the case that a distal mobile stop part is formed at the distal end section, the distal mobile stop part extends radially from the distal end section of the first stop device with respect to the spindle longitudinal axis so that, in a stop state in the case of a state of the linear adjuster at maximum adjustment length, the complementary stop part and the distal mobile stop part are in mutual contact with one another in the radial direction.

Embodiments of the linear adjuster according to the invention with a second spacer piece, which is arranged on the second stop device, the second spacer piece may be tubular.

According to one aspect of the invention, a positioning device with a linear adjuster, which is formed according to one of the embodiments of the linear adjuster according to the invention, is provided. In particular, it may be provided that an application component may be coupled to one of the ends of the linear adjuster, in particular by means of a connection device, and an application component may be coupled at another of the ends, in particular by means of a connection device.

According to one aspect of the invention, a positioning assembly is provided, which comprises at least two and in particular six linear adjusters in each case according to one of the embodiments of the linear adjuster according to the invention, wherein the at least two linear adjusters are arranged in such a way that their spindle longitudinal axes run along one another, wherein, at one side of the positioning assembly, the at least two linear adjusters may each be coupled to an application component and, at a second side of the positioning assembly, which is situated opposite the first side of the positioning assembly with respect to the spindle longitudinal axis, the at least two linear adjusters may be coupled to a further application component or may be brought into contact with a reference surface.

According to one aspect of the invention, a use of at least two linear adjusters is provided in each case according to one of the embodiments of the linear adjuster according to the invention, wherein the at least two linear adjusters are arranged in such a way that their spindle longitudinal axes run along one another, wherein the at least two linear adjusters, on one side of the positioning assembly, are coupled in each case to an application component and the at least two linear adjusters, on a second side of the positioning assembly which is situated opposite the first side of the positioning assembly with respect to the spindle longitudinal axis, are coupled to a further application component or are brought into contact with a reference surface.

According to one aspect of the invention, a method for repairing a linear adjuster according to one of the embodiments of the linear adjuster according to the invention is provided, wherein, by means of a fixation device, the first stop device is fixed to the first main body or the second stop device is fixed to the second main body in a stop provisioning state, in which the stop state occurs during the retraction movement or the extension movement, wherein the method comprises the steps of:

releasing the fixation device and moving the first stop device with respect to the first main body or moving the second stop device with respect to the second main body with a movement component which is directed opposite to the stop adjustment movement so that the linear adjuster is in a stop release state, moving the adjustment parts from the stop travel position by means of the spindle-and-spindle-nut mechanism relative to one another in the retraction movement or the extension movement.

The expression "along" herein means in the context of a directional indication referred to herein, which in particular may also relate to the course of a contour line or a surface or which may relate to a direction of a structural component such as a central axis or an axle or a shaft, with respect to a reference direction or a reference axis, that a portion of the directional indication or of the tangent to a respective contour line or to a respective surface in an explicitly or implicitly predetermined viewing direction deviates locally or in sections at an angle of a maximum of 45 degrees and in particular of a maximum of 30 degrees from the respective reference direction or reference axis, to which the respective directional indication is related.

The expression "transverse" herein means in the context of a directional indication referred to herein, which in particular may also relate to the course of a contour line or a surface or which may relate to a direction of a structural component such as a central axis or an axle or a shaft, with respect to a reference direction or a reference axis, that a portion of the directional indication or of the tangent to a respective contour line or to a respective surface in an explicitly or implicitly predetermined viewing direction deviates locally or in sections at an angle, which is between 45 degrees and 135 degrees, and preferably at an angle, which is between 67 degrees and 113 degrees, from the respective reference direction or reference axis, to which the respective directional indication is related.

The term "distance" in particular between two surfaces is understood herein to mean, in particular, the shortest distance.

For the description of the invention, the term "orientation" of a body is defined by the orientation of the body in space, which may be indicated by rotational coordinates of the body. The term "fixed in terms of orientation" herein is described herein as a state in which the orientation of the body remains unchanged.

The term "continuous" or "continuously connected", in particular with respect to a surface or a structural component extending in at least one longitudinal direction, such as a skin, a plate or wall, is understood herein to mean that the surface or structural component extends continuously.

The term "orientation" with respect to a plane and in particular surface is understood herein to mean the normal to the respective surface. In the case that the surface in question is not a straight but, for example, a curved surface, the normal to a straight surface of the same size may be used to determine the surface normal, wherein the orientation of the straight surface is defined such that the smallest deviation results in the sum relative to the curved surface.

In the following, embodiments of the invention will be described with reference to the accompanying figures. Herein, the description of features or components of embodiments according to the invention is to be understood such that a specific embodiment according to the invention, provided that this is not explicitly excluded, may also comprise at least one feature of another embodiment described herein specifically as an additional feature of this particular embodiment or as an alternative feature that replaces another feature of this particular embodiment.

Figure 4:
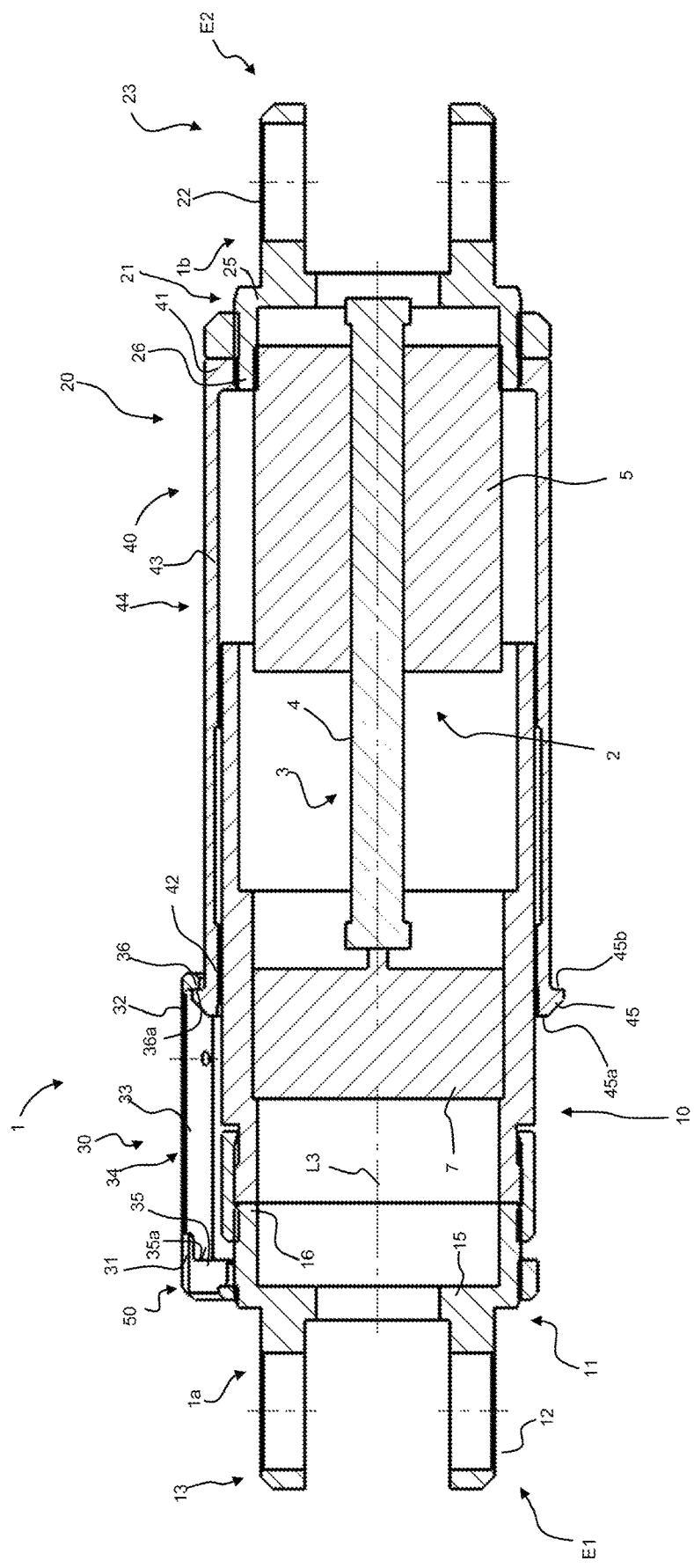
Figure 5:
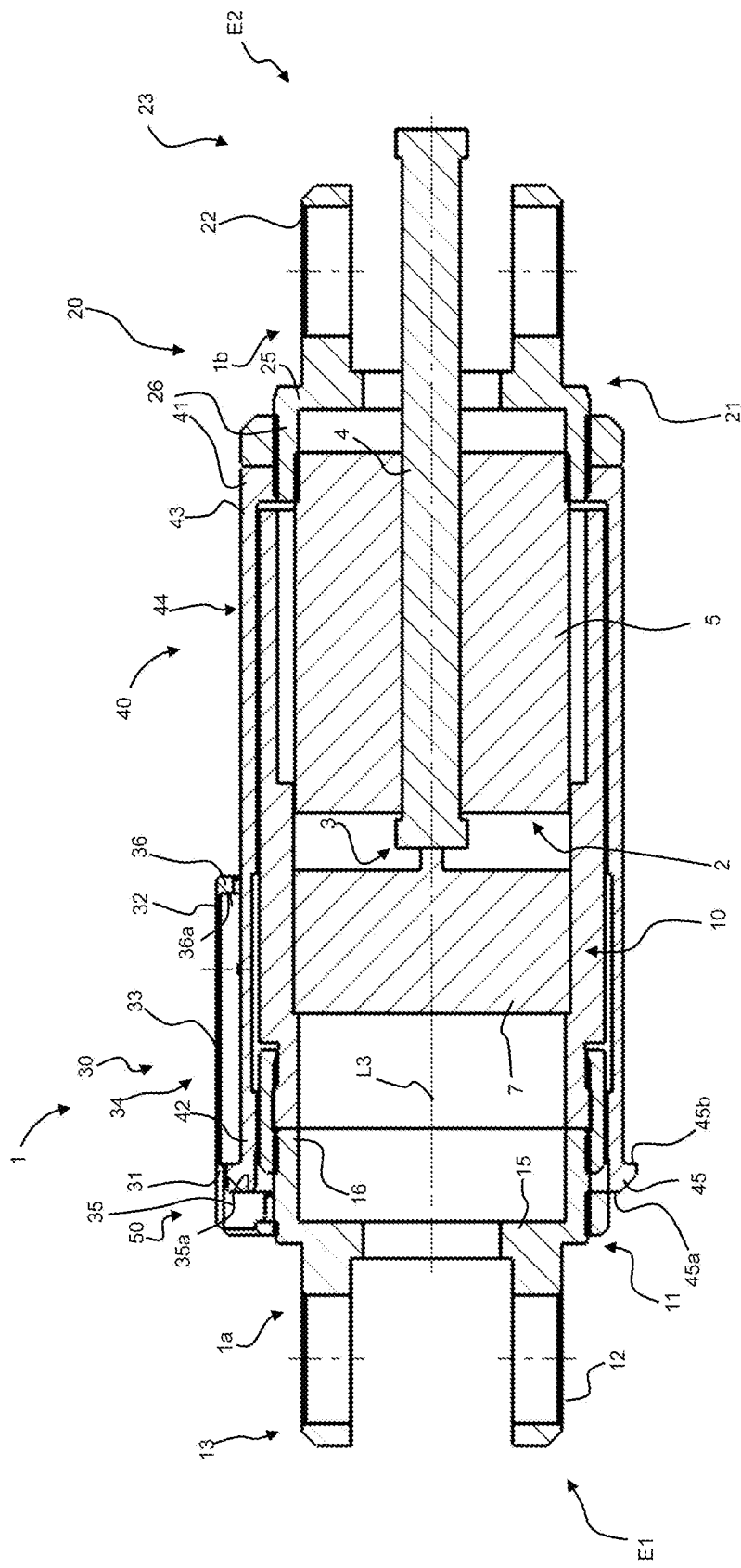
Figure 7:
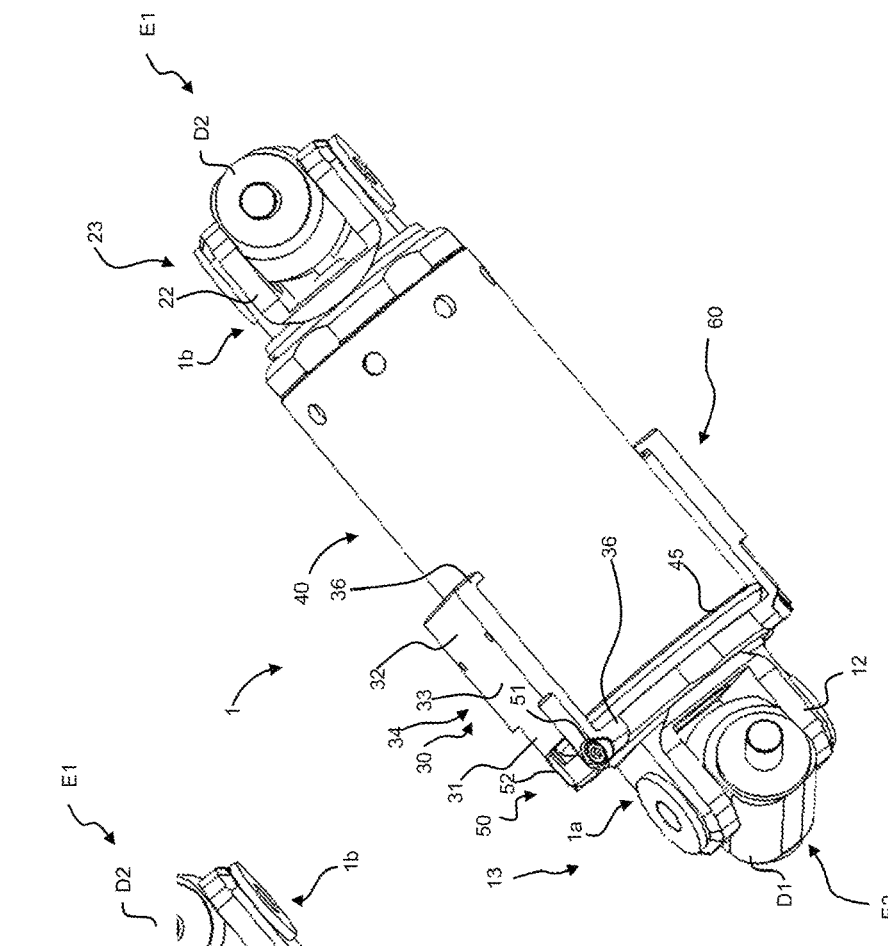
Figure 6:
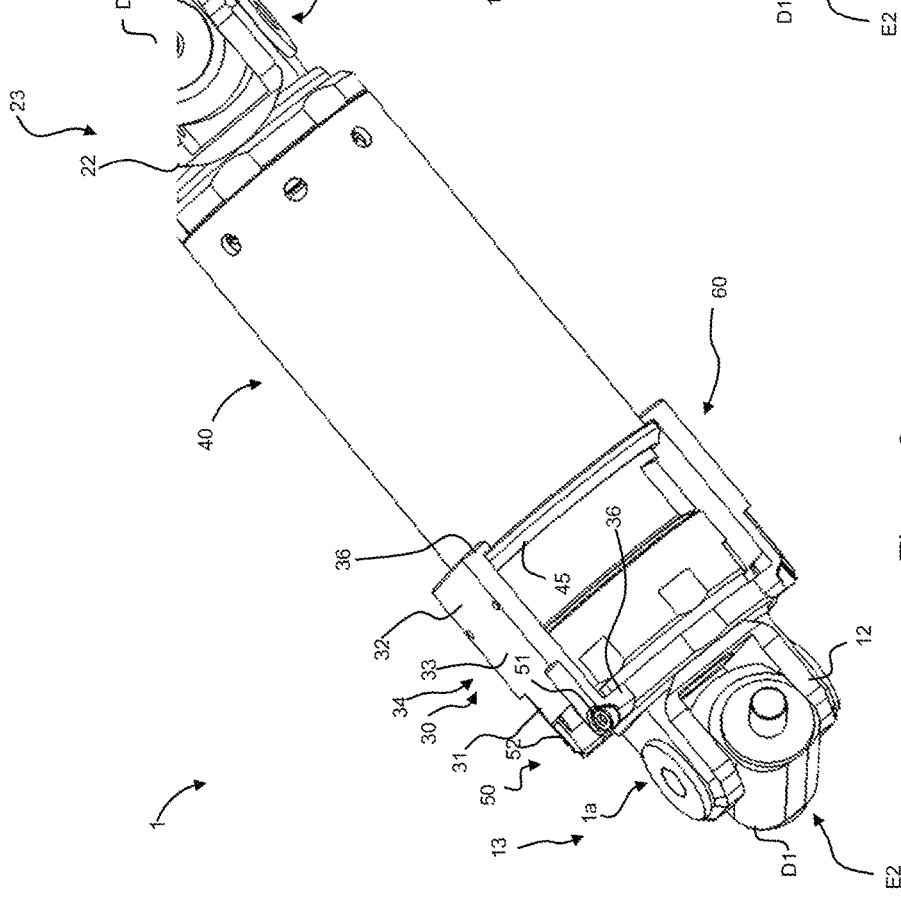
Figure 8:
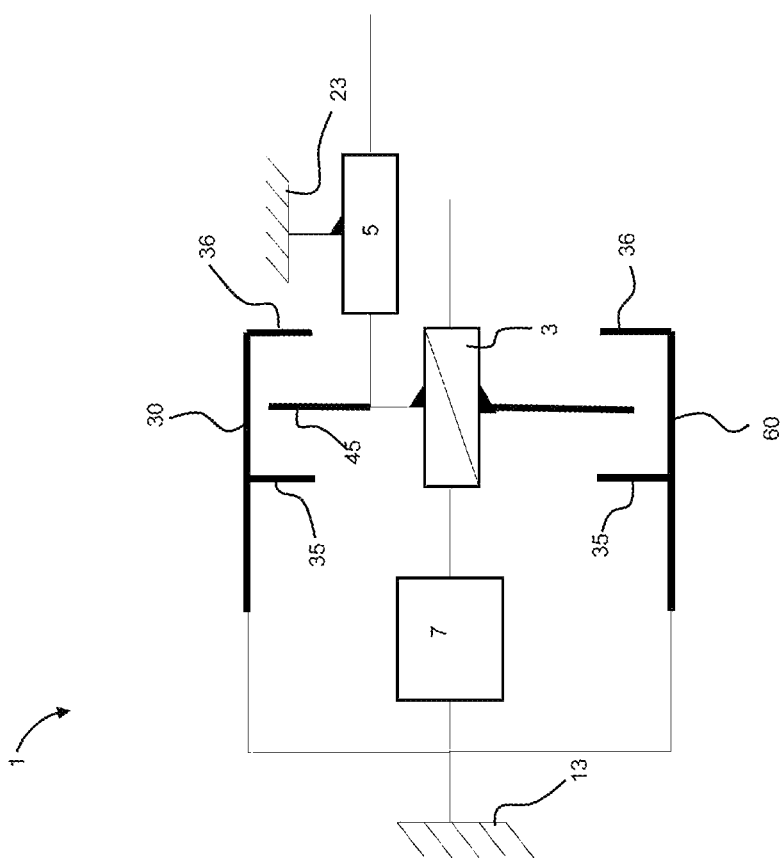
Figure 9:
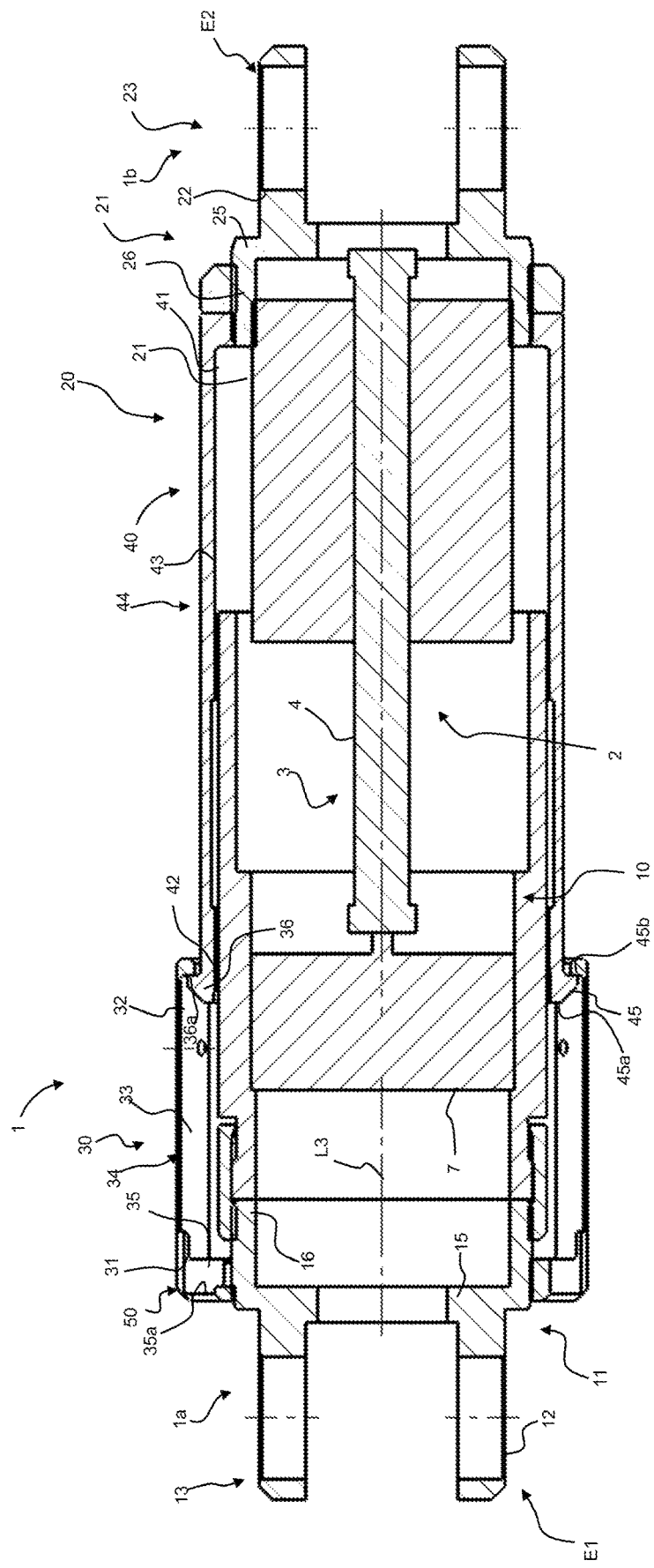
Figure 10:
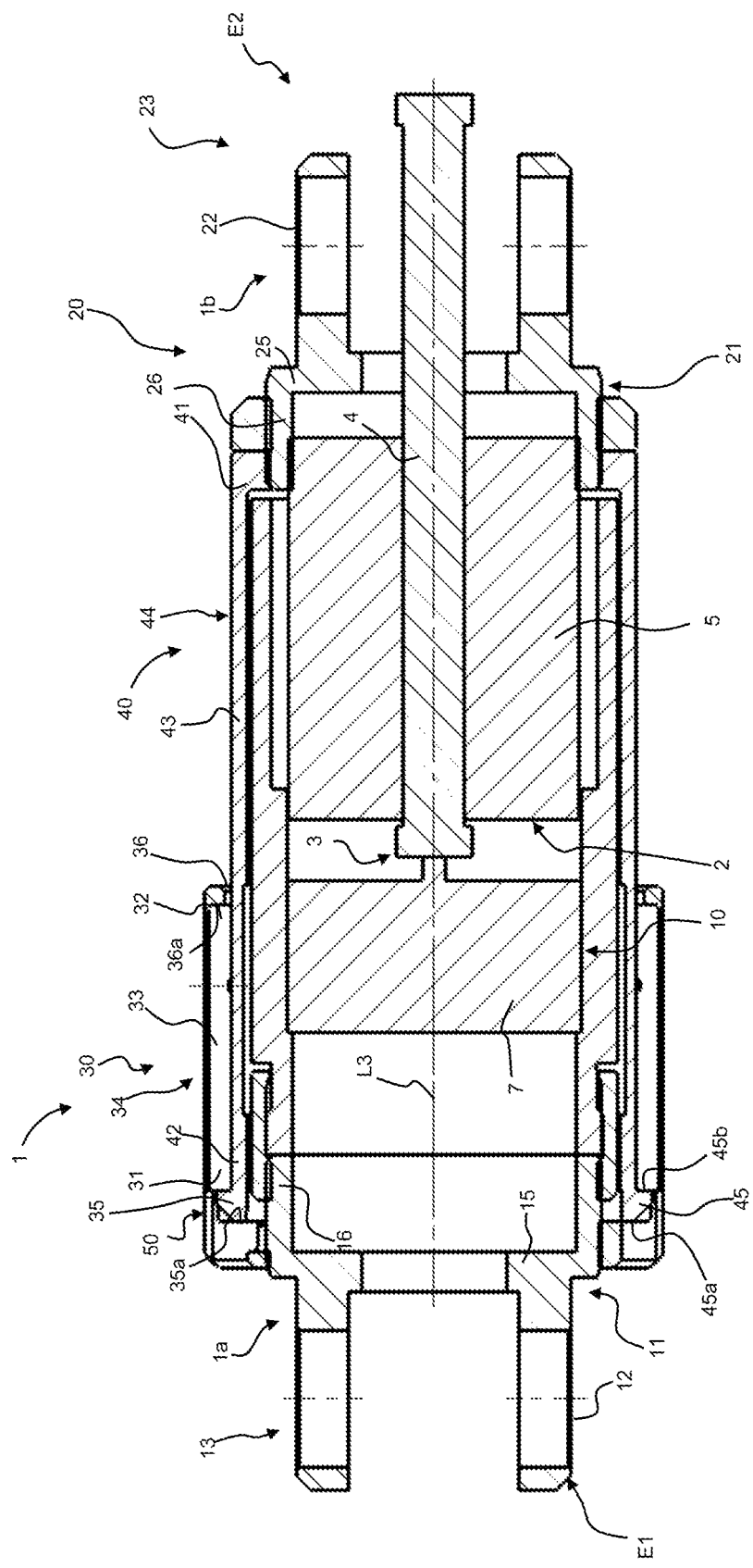

The figures show:

FIG. 1 shows a perspective illustration of an embodiment of the linear adjuster according to the invention, wherein the linear adjuster is shown in an extremely extended position within a predetermined adjustment range, FIG. 2 is a perspective view of the embodiment of the linear adjuster according to FIG. 1, wherein the linear adjuster is shown in an extremely retracted position within the predetermined adjustment range, FIG. 3 shows a kinematic representation of the embodiment of the linear adjuster according to FIG. 1, FIG. 4 shows a sectional view of the embodiment of the linear adjuster according to FIG. 1 in the extremely extended position of FIG. 1, FIG. 5 shows a sectional view of the embodiment of the linear adjuster according to FIG. 1 in the extremely retracted position of FIG. 2, FIG. 6 shows a perspective view of another embodiment of the linear adjuster according to the invention, wherein the linear adjuster is shown in an extremely extended position within a predetermined adjustment range, FIG. 7 is a perspective view of the embodiment of the linear adjuster according to FIG. 6, wherein the linear adjuster is shown in an extremely retracted position within the predetermined adjustment range, FIG. 8 shows a kinematic representation of the embodiment of the linear adjuster according to FIG. 6, FIG. 9 shows a sectional view of the embodiment of the linear adjuster according to FIG. 6 in the extremely extended position of FIG. 6, FIG. 10 is a sectional view of the embodiment of the linear adjuster according to FIG. 6 in the extremely retracted position of FIG. 7.

The linear adjuster 1 provided according to the invention is designed as a variable-length adjusting device with a spindle-and-spindle-nut mechanism 2 and with a first stop device 30 and a second stop device 40. In this case, it may be provided that with the linear adjuster 1 adjustment lengths between a minimum adjuster length and a maximum adjuster length may be provided, in each case when the linear adjuster 1 does not comprise the first stop device 30 and the second stop device 40, or, as a function of a current adjustment length, time derivatives may be set such as speeds and accelerations. The spindle-and-spindle-nut mechanism 2 comprises a spindle 3, which extends in a spindle longitudinal axis L3, and a spindle nut 5, which is supported by a spindle thread 4 of the spindle 3. When the spindle 3 and the spindle nut 5 are rotated relative to one another, the spindle 3 and the spindle nut 5 move relative to one another in the spindle longitudinal axis L3. The linear adjuster 1 comprises a first adjustment part 10 and a second adjustment part 20, which may be moved relative to one another in the spindle longitudinal axis L3 by the spindle-and-spindle-nut mechanism 2 due to the rotation of the spindle 3 and the spindle nut 5 relative to one another into in different adjustment states.

In this case, when the first stop device 30 and the second stop device 40 are not present on the linear adjuster 1, the linear adjuster 1 may assume adjustment states which lie between the following extreme actuating states:

(a) a shortest adjustment, in which the relative position of the spindle 3 and the spindle nut 5 produces a minimum adjustment length of the linear adjuster 1, that is to say a minimum retracted adjustment state, (b) a largest adjustment state, in which the relative position of the spindle 3 and the spindle nut 5 produces a maximum adjustment length of the linear adjuster 1, that is to say a maximum extended adjustment state.

The shortest actuating state or the largest actuating state may in each case be defined or set by a correspondingly designed end of the spindle thread 4 or a correspondingly designed movement stop of the spindle nut 5 on the spindle thread 4.

The linear adjuster 1 may itself comprise a motor 7 which is a component of the linear adjuster 1, which may drive the spindle-and-spindle-nut mechanism 2 and may thereby rotate spindle 3 and spindle nut 5 relative to one another in order to adjust the length of the linear adjuster 1. In this case, the linear adjuster 1 may be realized in such a way that the motor 7 rotates either the spindle 3 or the spindle nut 5. The motor 7 drives the spindle-and-spindle-nut mechanism 2 on the basis of the reception of control commands. The control commands are generated in an adjustment device or a control device and define a target movement of the motor 7 or a target adjustment length or a time derivative thereof.

According to a further embodiment, the linear adjuster 1 itself does not comprise a motor as a component of the linear adjuster 1, but is adjusted from the outside, in particular in that an outer actuating device adjusts the positions of the adjustment parts 10, 20 or the rotational positions of the end sections 1a, 1b relative to one another or by changing the setting state of the spindle-and-spindle-nut mechanism 2, i.e. the spindle 3 or the spindle nut 5. For example, it may be provided that the relative position of the adjustment parts 10, 20 is adjusted by a linear adjuster 1 according to the invention or according to the prior art, which comprises a motor 7, wherein the first adjustment part of which is coupled to the first adjustment part 10 and the second adjustment part of which is coupled to the second adjustment part 20. In this case, it may in particular be provided that the spindle 3 is supported in a rotationally fixed manner by the first main body 11 and the spindle nut 5 is rotationally fixed to the second main body 21.

The first adjustment part 10 comprises a first main body 11, which is situated at a first end E1 of the linear adjuster 1, and the first stop device 30. The second adjustment part 20 comprises a second main body 21, which is arranged at a second end E2 of the linear adjuster 1 is located, and the second stop device 40. The first main body 11 forms a first end portion 1a and the second main body 21 forms a second end portion 1b of the linear adjuster 1.

In the illustrated embodiments of the linear adjuster 1, the first main body 11 may comprise a first main body bottom 15 or a first main body bottom part, which is formed in the shape of a cup with a bottom plate and with a wall section 16 which surrounds the spindle longitudinal axis L3 and which extends towards the second end E2. As an alternative to this, the first main body base 15 or the first main body base part may also be formed as a whole in the form of a plate. In this case, a cylindrical extension section 17 is fastened to the first main body bottom 15, specifically at its end facing the second end E2, which extends continuously around the spindle longitudinal axis L3 and which extends from the first main body bottom 15 toward the second end E2. The extension portion 17 may also be formed in the form of a grid. Alternatively, the extension section 17 may also be formed fork-shaped with at least two forks. Also, the first main body bottom 15 and the extension portion 17 may be integrally formed or made of one piece. All embodiments of the linear adjuster 1 may also be formed without an extension portion 17.

In the illustrated embodiments of the linear adjuster 1, the motor 7 is received by the circumferential wall of the extension portion 17 and fixed or clamped by the latter. Alternatively or additionally, the motor 7 may also be fastened and fixed to the extension section 17 or the first main body bottom 15 or a first main body bottom part by means of at least one connection element or by means of adhesive. Alternatively, the motor 7 may also be fastened to the first main body bottom 15 or optionally to a circumferential wall section 16.

The first end portion 1a extends from the first main body bottom 15 in a direction directed away from the second end E2. However, the linear adjuster 1 may also be formed without the first end section 1a. As shown in FIGS. 1 to 10, the first end section 1a may be formed as a first bearing device 12 for disposing or coupling the linear adjuster 1 to a first application component.

The described variants of the first main body 11 may be realized in all embodiments of the linear adjuster 1.

In the illustrated embodiments of the linear adjuster 1, the second main body 21 comprises a second main body base 25 or a second main body base part, which is formed in the shape of a cup with a base plate and with a wall section 26 encircling the spindle longitudinal axis L3 and extends towards the first end E1. Alternatively, the second main body base 25 or the second main body base part may also be plate-shaped. The second main body bottom 25 or the second main body bottom part and the wall section 26 may be formed in one piece. These may also be produced from one piece or be fastened to one another as separate components. All embodiments of the linear adjuster 1 may also be formed without a wall section 26.

The second end portion 1b extends from the second main body bottom 25 in a direction away from the first end E1. However, the linear adjuster 1 may also be formed without the second end portion 1b. As shown in FIGS. 1 to 9, the second end section 1b may be formed as a second bearing device 12 for the attachment or coupling of the linear adjuster 1 to a second application component.

The described variants of the second main body 21 may be realized in all embodiments of the linear adjuster 1.

The first stop device 30 extends from the first main body 11 in the direction of the spindle longitudinal axis L3 toward the second end E2. In the embodiments of FIGS. 1 to 10, the first stop device 30 is formed in the form of a clamp or bridge. The first stop device 30 may be supported on the first main body 21 in a rotationally fixed or fixed manner in relation to a circumferential direction which runs around the spindle longitudinal axis L3.

The second stop device 40 extends from the second main body 21 in the direction of the spindle longitudinal axis L3 toward the first end E1. As shown in FIGS. 1 to 10, the second stop device 40 is fixed in a rotationally fixed or fixed manner to the second main body 21 and in particular to the wall section 26 in relation to a circumferential direction which runs around the spindle longitudinal axis L3. In this case, the second stop device 40 is realized as a cylindrical section which continuously runs around the spindle longitudinal axis L3 and extends from the second main body bottom 25 towards the second end E2. The second stop device 40 may alternatively also be formed in the form of a grid. Alternatively, the extension section 17 may also be rod-shaped or fork-shaped with at least two forks. The described variants of the second stop device 40 may be realized by all embodiments of the linear adjuster 1.

Each of the embodiments of the linear adjuster 1 according to the invention, as shown in FIGS. 1 and 2, may be realized in such a way that it comprises a first pivot bearing D1 which is supported on the first bearing device 12 in order to couple the first main body 11 to the first application component. Alternatively or additionally, each of the embodiments of the linear adjuster 1 according to the invention, as shown in FIGS. 1 and 2, may be realized in such a way that it comprises a second pivot bearing D2 which is supported in the second bearing device 22 in order to couple the second main body 21 to the second application component. FIGS. 1 and 2 show that the first bearing device 12 and the first pivot bearing D1 may form a first connection device 13 and that the second bearing device 22 and the second pivot bearing D2 may form a second connection device 23. In this case, the first bearing device 12 and the second bearing device 22 are arranged in a rotationally fixed manner relative to one another, so that the first main body 11 and the second main body 21 are also arranged in a rotationally fixed manner relative to one another.

Each of the embodiments of the linear adjuster 1 according to the invention may be realized in such a way that the first bearing device 12 or the second bearing device 22 is not present or both bearing devices 12, 22 are not present.

The spindle 3 is mounted on the first main body 11 and the spindle nut 5 is mounted on the second main body 21. According to the invention, the following embodiments may be provided:

(R1) the spindle 3 is supported on the first main body 11 so as to be rotatable relative thereto and fixed in the direction of the spindle longitudinal axis L3, and the spindle nut 5 is supported in a rotationally fixed manner on the second main body 21;

(R2) the spindle 3 is supported in a rotationally fixed manner on the first main body 11 and the spindle nut 5 is supported on the second main body 21 so as to be rotatable relative thereto and fixed in the direction of the spindle longitudinal axis L3.

In the case that the linear adjuster 1 comprises a motor 7, the same may be integrated in the linear adjuster 1 in the realization (R1) in such a way that the motor 7 drives the spindle 3 and causes rotation of the spindle 3 in order to change the adjustment state of the linear adjuster 1. In this case, the motor 7 may be supported on the first main body 11. This embodiment of the linear adjuster 1 is shown in FIG. 4. Alternatively, the motor 7 may be supported on the second main body 21. In case that the linear adjuster 1 comprises a motor 7, this may be integrated in the linear adjuster 1 in the realization (R2) in such a way that the motor 7 drives the spindle nut 5 and causes rotation of the spindle 3 in order to change the adjustment state of the linear adjuster 1. In this case the motor 7 may be supported on the second base body 21 or alternatively on the first base body 11. In further embodiments, the alternatives described for the implementations (R1) and (R2) may also be combined with one another. In the embodiments described in this context, provision may in particular be made for the end sections 1a, 1b to be supported in a rotationally fixed manner with respect to one another by means of an external bearing or application components. As an alternative to this, the end sections 1a, 1b may be supported such that they can rotate in relation to one another by means of an external bearing or application components.

Both the first adjustment part 10 and the second adjustment part 20 or one of the adjustment parts 10, 20 may be designed as a support leg in which the respective bearing device 12 or 22 is realized as a foot part or contact part. Thus, the linear adjuster 1 may be set with the first or the second adjustment part 10, 20 on a floor or a reference surface such as the surface of a table or a laboratory device or be arranged or mounted on a reference component, while an application component may be mounted or coupled to the other of the two adjustment parts 10, 20 or may be brought into contact with the other of the two adjustment parts 10, 20 in order to move the same relative to the ground or to the reference surface.

In all embodiments of the invention, an application component may generally be a functional component which is adjustable with respect to a floor or a reference surface and, for example, a sensor, a mirror, a tool.

According to the invention, the linear adjuster 1 according to the invention may form a positioning device. The positioning device may in particular comprise the first connection device 13 and the second connection device 23. Further, the positioning device may comprise a motor 7, which is integrated in the linear adjuster 1 according to an embodiment described herein. Furthermore, the linear adjuster 1 may comprise a control interface which is functionally connected to the motor 7, and which transmits a control command corresponding to a target adjustment state or a nominal signal to the motor 7, wherein the motor 7 actuates the spindle-and-spindle-nut mechanism 2 on the basis of the desired signal in such a way that the linear adjuster 1 moves in the direction of the target adjustment state and in particular in an adjustment state which is close to the target adjustment state. The nominal signal can be transmitted to the control interface, for example, by manual actuation of an input device or by an external controller functionally connected to the control interface. The same may be functionally connected to the at least one application component.

In general, a linear adjuster 1 according to the invention or a plurality of linear adjusters 1 according to the invention may be arranged between two application components and supported on the same or between an application component and a reference surface or reference device. In this case, the distance or the position between the two application components may be adjusted by adjusting the adjustment length of the at least one linear adjuster 1. According to the invention, reference surface or reference device is understood to mean a surface or device which is not to be adjusted with the linear adjuster 1 in position and orientation, but relative to which the one application component is to be adjusted with regard to its position or orientation or with regard to its position and orientation.

According to the invention, at least two linear adjusters 1 according to one of the embodiments according to the invention described herein may also form a positioning assembly. In this case, the at least two linear adjusters 1 may in particular be arranged in such a way that their spindle longitudinal axes L3 run along one another. On a first side of the positioning assembly, on which, for example, the first ends or the second ends of the at least two linear adjusters 1 may be situated, the at least two linear adjusters 1 are coupled to an application component and on a second side of the positioning assembly, which is situated opposite the first side of the positioning assembly with respect to the spindle longitudinal axis L3, the at least two linear adjusters 1 are coupled to a further application component or brought into contact with a reference surface or connected to a reference surface. In this case, at least one of the linear adjusters 1 or several or all of the linear adjusters 1 may comprise the aforementioned control interface. The positioning assembly may also comprise an external control which actuates the at least one control interface with a nominal signal. In this case, the linear adjusters 1 of a positioning assembly may be arranged with the first or the second adjustment part 10, 20 on a bottom or on a reference surface or be mounted on a reference component or an application component, while an optionally further application component may be mounted or coupled or brought into contact with the other of the two adjustment parts 10, 20.

For example, the positioning assembly or the plurality of linear adjusters 1 may be designed as a parallel kinematics mechanism with at least two linear adjusters 1 according to one or more of the embodiments according to the invention described herein. In this case, it may be provided in particular that the spindle longitudinal axes L3 of the at least two linear adjusters 1 run parallel to one another or at an angle to one another in such a way that the smallest angle, in that the spindle longitudinal axes L3 of the linear adjusters 1 extend to one another, amounts to a maximum of 45 degrees. In particular, the positioning assembly may comprise three linear adjusters 1 according to one or more of the embodiments according to the invention described herein and may be designed as a so-called tripod. In addition, the positioning assembly may preferably comprise six linear adjusters 1 according to one or more of the embodiments according to the invention described herein and may be designed as a so-called hexapod.

Depending on the relative position of the two adjustment parts 10, 20 with respect to one another, the linear adjuster 1 has or the linear adjusters 1, in an adjustment state, an adjustment length LV, which results from corresponding definition of length end points in each case at an end section of the two end sections 1a, 1b of the linear adjuster 1 as a distance between these length end points.

The first stop device 30 and the second stop device 40 may generally be designed in such a way that they execute a stop adjustment movement relative to one another and may come into a stop state in which at least one contact surface of the first stop device 30 and at least one contact surface of the second stop device 40 contact each other when the linear adjuster 1 executes an extension movement, in which an increase in the adjustment length LV occurs. In the stop state, the first adjustment part 10 and the second adjustment part 20 are in a stop travel position, which is predetermined by the position and shape of the stop devices 30, 40, relative to one another in which a respective contact surface of the first stop device 30 and a respective contact surface of the second stop device 40 are in contact with one another and in which the adjustment length LV comprises a stop maximum adjuster length Lmax. Such an adjustment state is shown in FIG. 4.

As an alternative or in addition thereto, the first stop device 30 and the second stop device 40 may generally be designed in such a way that the same execute a stop adjustment movement relative to one another and may come into a stop state in which at least one contact surface of the first stop device 30 and at least one contact surface of the second stop device 40 bear against one another when the linear adjuster 1 executes a retraction movement, in which a reduction of the adjustment length LV takes place. In the stop state, the first adjustment part 10 and the second adjustment part 20 are in a stop travel position relative to one another, which is predetermined by the position and shape of the stop devices 30, 40, in which a respective contact surface of the first stop device 30 and a respective contact surface of the second stop device 40 are in contact with one another and in which the adjustment length LV comprises a stop minimum adjuster length Lmin. Such an adjustment state is shown in FIG. 5.

FIGS. 1 to 10 show embodiments of the linear adjuster 1 in which both of the following operating states (i), (ii) may occur:
  (i) the maximum adjuster length stop state shown in FIG. 4 and in FIG. 9, in which the linear adjuster 1 assumes a stop maximum adjuster length Lmax, wherein the maximum adjuster length stop state enters and as a result an extension movement of the linear adjuster 1 is stopped,
  (ii) the minimum adjuster length stop state shown in FIG. 5 and in FIG. 10, in which the linear adjuster 1 assumes a stop minimum adjuster length Lmin, wherein the minimum adjuster length stop state enters and as a result a retraction movement of the linear adjuster 1 is stopped.

In all embodiments according to the invention, the linear adjuster 1 may alternatively be designed with the first stop device 30 and the second stop device 40 in such a way that only one of the two stop states (i), (ii) occurs.

FIGS. 3 and 8 show schematically in each case an intermediate stop state, that is to say a stop state which lies between the maximum adjuster length stop state of FIG. 4 or FIG. 9 and the minimum adjuster length stop state of FIG. 5 or FIG. 10.

The embodiment of the first stop device 30 of FIGS. 4 and 5 and of FIGS. 9 and 10 is designed in such a way that the first stop device 30 comprises two contact surfaces which are spaced apart from one another in the spindle longitudinal axis L3. The contact surfaces each provide one of the stop states (i), (ii) as a retractable event.

The embodiments of the invention shown in the figures comprise the first stop device 30 with a first spacer piece 34 and at least one mobile stop part. In this case, the first spacer piece 34 protrudes from the first main body 11 in the direction of the spindle longitudinal axis L3 towards the second end E2 and the first spacer piece 34 comprises a proximal end portion 31 which is located relatively close to the first main body 11 or the first end E1, and a distal end portion 32 which is located relatively remote from the first main body 11 or the first end E1, and a first connection piece 33 connecting the same.

In the embodiments of the linear adjuster 1 according to the invention, the first stop device 30 may be realized in particular according to one of the alternatives (m), (n):
  (m) at the proximal end section 31, a proximal mobile stop part 35 is formed, which extends radially from the first connection piece 33 with respect to the spindle longitudinal axis L3,
  (n) at the distal end portion 32, a distal mobile stop member 36 is formed extending radially from the first connection piece 33 with respect to the spindle longitudinal axis L3.

The embodiments of the invention illustrated in the figures comprise both the realization (m) and the realization (n). In an alternative embodiment of the invention, it may be provided that the realization (m) or (n) is not present, i.e. only the realization (m) or the realization (n) is present.

In this case, the proximal mobile stop part 35 may be realized as a radially extending transition piece between the first main body 11 and the first connection piece 33. In the illustrated embodiment, the proximal mobile stop part 35 and the distal mobile stop part 36 each extend from the first connection piece 33 radially in the direction of the spindle longitudinal axis L3.

The first spacer piece 34 may in particular be embodied in a clamp-like or bridge-like manner, i.e. not tubular and circumferentially running around the spindle longitudinal axis L3. In this case, the length of the first spacer piece 34 which extends in the spindle longitudinal axis L3 may be larger by a factor of 1.2 than the average width vertically to this length and to the radial direction with respect to the spindle longitudinal axis L3. As an alternative to this, the first spacer piece 34 may be tubular and circumferentially running around the spindle longitudinal axis L3. In this case, the first spacer piece 34 may comprise the features of the second stop device 40 described herein.

In each of the embodiments of the linear adjuster 1 according to the invention, as shown in the figures, the second stop device 40 may comprise a second spacer piece 44 and a complementary stop part 45. In this case, the second spacer piece 44 projects away from the second main body 21 in the direction of the spindle longitudinal axis L3 towards the first end E1. The second spacer piece 44 comprises a connection section 41, which is connected to the second main body 21 in a rotary fixed manner, a stop section 42 and a connection piece 43 which connects the same. As shown in the figures, the second spacer piece 44 may in particular be tubular.

In the embodiments of the linear adjuster 1 shown in the figures, the complementary stop part 45 may be an edge portion of the stop section 42, wherein the edge portion is oriented toward the first end E1 in the direction of the spindle longitudinal axis L3. The complementary stop part 45 moves between the operating states (i) and (ii) in the direction of the spindle longitudinal axis L3 between the proximal mobile stop part 35 and the distal mobile stop part 36. Alternatively or additionally, the complement stop part 45 may be arranged on the connection piece 43 and extend radially from the stop section 42 with respect to the spindle longitudinal axis L3. In this case, the direction, in which the complementary stop part 45 extends radially from the stop section 42 with respect to the spindle longitudinal axis L3, runs opposite to the direction in which the proximal mobile stop part 35 and the distal mobile stop part 36 extend from the first stop device 30.

In the embodiments of the linear adjuster 1 shown in the figures, the proximal mobile stop part 35 comprises a proximal contact surface 35a and the distal mobile stop part 36 comprises a distal contact surface 36b, wherein the proximal bearing surface 35a and the distal bearing surface 36a are oriented facing one another. As an alternative to this, the proximal abutment surface 35a and the distal abutment surface 36a may be formed on the first spacer piece 34 or the connection piece 35. In the embodiments of the linear adjuster 1 shown in the figures, the complementary stop part 45 comprises a first contact surface 45a and a second contact surface 45b, which are directed opposite to one another. In the operating state (i), the second contact surface 45b of the complementary stop part 45 and the distal contact surface 36a of the distal mobile stop part 36 rest against one another. In the operating state (ii), the first contact surface 45a of the complementary stop part 45 and the proximal bearing surface 35a of the proximal mobile stop part 35 rest against one another.

In embodiments of the linear adjuster 1, in which the features (n) do not exist, the linear adjuster 1 may be realized without a second contact surface 45b of the complementary stop part 45 and in particular without a complementary stop part 45. In this case, the first contact surface 45a of the complementary stop part 45 may be realized as the surface or edge surface of the second stop device 40 which faces the first end section 1a or the first end E1. In embodiments of the linear adjuster 1, in which the features (m) are not formed, the linear adjuster 1 may be implemented without a proximal contact surface 35a.

According to the invention, the linear adjuster 1 may also comprise a plurality of first stop devices, i.e. of first stop devices which are located at the first end E1 of the linear adjuster 1. In this case, the plurality of first stop devices may each be realized according to one of the implementations thereof described herein.

In the embodiment of the linear adjuster 1 shown in FIGS. 6 to 10, two first stop devices are arranged, which are designated by the reference numerals "30" and "60". In this embodiment, the first stop devices 30, 60 are designed identically to one another and are arranged opposite one another with respect to the spindle longitudinal axis L3. Alternatively, the first stop devices 30, 60 may each be realized according to one of the variants described herein.

According to the invention, as shown in the figures, the first stop device 30 may be held in a stop provisioning state by means of a fixation device 50, wherein the fixation device 50 fixes the first stop device 30 in relation to its position and orientation against a movement relative to the first adjustment part 10. In the stop provision state, depending on the embodiment of the stop devices 30, 40, one or both of the stop states (i), (ii) may occur when the spindle-and-spindle-nut mechanism (2) is in a corresponding adjustment state.

In the illustrated embodiments, the fixation device 50 is formed at the proximal end portion 31. Alternatively, the fixation device 50 could be formed on the distal end portion 32 or on the connection piece 33.

In the embodiments of the linear adjuster 1 shown in FIGS. 4 and 5 and FIGS. 9 and 10, the first stop device 30 is held in the stop provisioning state by means of the fixation device 50, wherein the fixation device 50 fixes the first stop device 30 in relation to its position and orientation against a movement relative to the first adjustment part 10. In this case, the first stop device 30 is fastened and fixed in the stop provisioning state by means of a connecting element 51 on the first main body 11 and in particular the first main body base 15 and thus locked. This fastening or locking is realized by means of two connection elements 51, 52, each of which projects through through-bores formed laterally in the proximal end portion 31 and into bores which are formed in the first main body bottom 15. The longitudinal direction of the connection elements 51, 52 may run along or transversely to the spindle longitudinal axis L3. Alternatively, the linear adjuster 1 may also be realized in such a way that the same comprises only one connecting element and only one through-bore and bore formed in the proximal end section 31 in the first main body base 15.

By releasing the fixation device 50 and in particular the at least one connection element 51, 52, the first stop device 30 is brought into the stop release state with respect to the first main body 11, in particular in case that the bearing surfaces which face one another run correspondingly ramp-shaped and in pairs as sliding surfaces. In particular, in case that the distal contact surface 36a and the second contact surface 45b extend along one another and in this case each extend at an angle of, for example, greater than 1 degree with respect to the radial direction and each are directed radially outward in the direction of the first end E1, the operating state (i) does not occur in the stop release state, since, with the stop maximum adjustment length Lmax, the distal contact surface 36a and the second contact surface 45b slide along one another. In this case, the first stop device 30 is moved radially outward and the further movement of the second stop device 40 is no longer prevented. In the same way, in particular in case that the proximal contact surface 35a and the first contact surface 45a extend along one another and in this case each extend at an angle of, for example, greater than 1 degree with respect to the radial direction and are directed radially outward in the direction of the second end E2, the situation can occur that in the stop release state the operating state (ii) does not occur, since the proximal contact surface 35a and the first contact surface 45a slide along one another in the stop maximum adjustment length Lmin. In this case, the first stop device 30 is moved radially outward and the further movement of the second stop device 40 is no longer prevented.

Without this special design of the surfaces, these effects may also be achieved in that the respective through-bore formed in the proximal end section 31 and the respective bore in the first main body base 15 is formed as elongated holes.

Furthermore, the fixation device 50 may be realized as a clip connection. As an alternative or in addition to the described variants of the fixation device 50, the same may be realized as a clamping device, which may be designed as a press fit between the first main body 11 and the first stop device 30 and in particular the proximal end section 31.

Thus, by designing the stop device 30 and the first main body 11, the same may be achieved that, after releasing the mechanical fixing of the fixation device 50, the linear adjuster 1 is in a stop release state.

In the illustrated embodiments of the linear adjuster 1, the first stop device 30 can also be removed radially outwards with respect to the spindle axis by moving the at least one connection element 51, 52 out of its connection with the first main body 11 and in particular the bore in the same when the fixation device 50 is released, so that the fixation device 50 is then in the stop release state.

In each embodiment of the linear adjuster 1, this and in particular the spindle-and-spindle-nut mechanism 2 may be designed in such a way that the range of movement of the spindle 3 and the spindle nut 5 in the stop release state is larger than the range of movement of the spindle 3 and the spindle nut 5 in the stop provisioning state. For this reason, the adjustment parts in the stop release state may be moved from one of the stop travel positions by means of the spindle-and-spindle-nut mechanism relative to one another in the retraction movement and the extension movement.

Alternatively or additionally, each of the embodiments of the linear adjuster 1 according to the invention may be realized in such a way that the second stop device 40 is coupled to or fastened to the second main body 21 by means of a fixation device in order to hold the same in a stop provisioning state. In this case, in the stop provisioning state, the fixation device fixes the second stop device 40 in relation to its position and orientation against a movement relative to the second adjustment part 20. In the stop provisioning state, one or both of the stop states (i), (ii) can occur, depending on the embodiment of the stop devices 30, 40, when the spindle-spindle nut mechanism 2 is in the respective corresponding adjustment state. The fixation device may be realized analogously to one of the variants of the fixation device 50 described herein, which acts between the first main body 11 and the first stop device 30.

Alternatively, each of the embodiments of the linear adjuster 1 according to the invention may be realized in such a way that the transition from the stop provisioning state to the stop release state occurs by at least partially moving the first stop device 30 or the second stop device 40 with respect to the spindle axis radially outward by being pivoting the same. In these embodiments, the fixation device 50 may be designed as a hinge joint with the connecting element 51 as an axis of rotation, so that after the release of the connection element 51 and its counterpart, the connection element 51 remains in the through bores of the first main body 11 and the fixation device 50 and in this state the fixation device 50 can be pivoted relative to the first main body 11 into the stop release state in which the first stop device 30 and the second stop device 40 cannot be brought into mutual abutment.

In embodiments of the linear adjuster 1, which comprise two first stop devices 30, 60, that is to say the stop device 30 and the additional stop device 60, the additional stop device 60 comprises combinations of features which have been described above on the basis of the stop device 30.

Thus, with one of the embodiments of the linear adjuster 1 described herein, a method for repairing the linear adjuster 1 may be carried out. In operation, in a stop provisioning state the first stop device 30 is fixed to the first main body 11 by means of the fixation device 50 or the second stop device 40 is fixed to the second main body 21 by means of a fixation device, wherein in the stop provisioning state the stop state occurs during the retraction movement or the extension movement.

Starting from this, according to the method, the respective fixation device is released and the first stop device 30 is moved relative to the first main body 11 or the second stop device 40 is moved relative to the second main body 21 with a movement component that is opposed to the stop adjustment movement so that the linear adjuster 1 is in the stop release state. Thereafter, the adjustment parts 10, 20 are moved by the spindle-and-spindle-nut mechanism 2 from the stop travel position relative to one another in the retraction movement or the extension movement.

REFERENCE NUMERALS 1 linear adjuster
1a first end section
1b second end section
2 spindle-and-spindle-nut mechanism
3 spindle
4 spindle thread
5 spindle nut
7 motor
10 first adjustment part
11 first main body
12 first bearing device
13 first connection part
15 first main body bottom
16 circumferential wall section
17 extension section
20 second adjustment part
21 second main body
22 second bearing device
23 second connection part
25 second main body bottom
26 circumferential wall section
30 first stop device
31 proximal end section
32 distal end section
33 connection piece
34 first spacer piece
35 proximal mobile stop part
35a proximal contact surface
36 distal mobile stop part
36a distal contact surface
40 second stop device
41 connection section
42 stop section
43 connection part
44 second spacer piece
45 complementary stop part
45a first contact surface
45b second contact surface
50 fixation device
51, 52 connection elements
60 further first stop device
D1 first pivot bearing
D2 second pivot bearing
E1 first end of the linear adjuster 1
E2 second end of the linear adjuster 1
L3 spindle longitudinal axis
Lmax maximum adjuster length
Lmin minimum adjuster length

The invention claimed is:

1. A linear adjuster comprising:
a spindle-and-spindle-nut mechanism;
a first adjustment part which comprises a first main body at a first end of the linear adjuster and a first stop device;
a second adjustment part which comprises a second main body at a second end of the linear adjuster and a second stop device, wherein the first end and the second end are situated opposite one another, wherein the first adjustment part and the second adjustment part can be moved relative to one another by means of the spindle-and-spindle-nut mechanism with a spindle longitudinal axis L3;
wherein the first stop device and the second stop device come into a stop state, in which the first stop device and the second stop device are in contact with one another with mutually facing surfaces, when the linear adjuster executes a stop adjustment movement with a reduction of an adjustment length LV during a retraction movement or with an increase in the adjuster length LV during an extension movement, and the first adjustment part and the second adjustment part are located in a predetermined respective stop travel position relative to one another;

wherein, by means of a fixation device, the first stop device is mechanically fixed to the first main body or the second stop device is mechanically fixed to the second main body in a stop provisioning state, in which the stop state occurs during the retraction movement or the extension movement, and wherein, after releasing the mechanical fixation of the fixation device, the linear adjuster is in a stop release state, in which the adjustment parts are movable from the stop travel position with the spindle-and-spindle-nut mechanism relative to one another in the retraction movement and the extension movement;

wherein the first stop device comprises a first spacer piece and at least one mobile stop part, wherein the first spacer piece protrudes from the first main body in the direction of the spindle longitudinal axis L3 towards the second end, and the first spacer piece comprises a proximal end section, a distal end section and a connection piece which connects the same, and wherein the first stop device includes:

at the proximal end portion a proximal mobile stop part, which extends radially from the first stop device with respect to the spindle longitudinal axis L3, at the distal end portion a distal mobile stop part, which extends radially from the first stop device with respect to the spindle longitudinal axis L3.

2. The linear adjuster according to claim 1, wherein, in the stop provisioning state, the first stop device is arranged on the first main body in a mechanically fixed or locked manner by which its position and orientation is fixed in a mechanically fixed or fixed manner by means of the fixation device, and wherein, in order to achieve the stop release state, the fixation device is released and the first stop device is mechanically released for a movement away from the first main body in relation to the spindle axis radially outward into the stop release state.

3. The linear adjuster according to claim 1, wherein the first stop device is clamp-like.

4. The linear adjuster according to claim 1, wherein the fixation device is formed at the proximal end portion.

5. The linear adjuster according to claim 1 further comprising a first connection device for connecting an application component to the linear adjuster.

6. At least two linear adjusters according to claim 5, wherein the at least two linear adjusters are arranged in parallel, wherein at one end of the parallel arrangement of the at least two linear adjusters, the linear adjusters are each coupled to an application component, and wherein at an opposing end of the parallel arrangement of the at least two linear adjusters, the linear adjusters are each coupled to a second application component or brought into contact with a reference surface.

7. The at least two linear adjusters according to claim 6, wherein the at least two linear adjusters are six linear adjusters.

8. The linear adjuster according to claim 1, further comprising a positioning device.

9. At least two linear adjusters according to claim 1, wherein the at least two linear adjusters are arranged in parallel, wherein at one end of the parallel arrangement of the at least two linear adjusters, the linear adjusters are each coupled to an application component, and wherein at an opposing end of the parallel arrangement of the at least two linear adjusters, the linear adjusters are each coupled to a second application component or brought into contact with a reference surface.

10. The at least two linear adjusters according to claim 9, wherein the at least two linear adjusters are six linear adjusters.

11. A method for repairing a linear adjuster according to claim 1, wherein, by means of a fixation device, the first stop device is fixed to the first main body or the second stop device is fixed to the second main body in a stop provisioning state, in which the stop state occurs during the retraction movement or the extension movement, wherein the method comprises the following steps:

releasing the fixation device and moving the first stop device with respect to the first main body or moving the second stop device relative to the second main body with a movement component, which is directed opposite to the stop adjustment movement, such that the linear adjuster is in a stop release state, moving the adjustment parts from the stop travel position by means of the spindle-and-spindle-nut mechanism relative to each other in the retraction movement or the extension movement.

12. A linear adjuster comprising:

a spindle-and-spindle-nut mechanism;

a first adjustment part which comprises a first main body at a first end of the linear adjuster and a first stop device;

a second adjustment part which comprises a second main body at a second end of the linear adjuster and a second stop device, wherein the first end and the second end are situated opposite one another, wherein the first adjustment part and the second adjustment part can be moved relative to one another by means of the spindle-and-spindle-nut mechanism with a spindle longitudinal axis L3;

wherein the first stop device and the second stop device come into a stop state, in which the first stop device and the second stop device are in contact with one another with mutually facing surfaces, when the linear adjuster executes a stop adjustment movement with a reduction of an adjustment length LV during a retraction movement or with an increase in the adjuster length LV during an extension movement, and the first adjustment part and the second adjustment part are located in a predetermined respective stop travel position relative to one another;

wherein, by means of a fixation device, the first stop device is mechanically fixed to the first main body or the second stop device is mechanically fixed to the second main body in a stop provisioning state, in which the stop state occurs during the retraction movement or the extension movement, and wherein, after releasing the mechanical fixation of the fixation device, the linear adjuster is in a stop release state, in which the adjustment parts are movable from the stop travel position with the spindle-and-spindle-nut mechanism relative to one another in the retraction movement and the extension movement;

wherein the first stop device comprises a first spacer piece and at least one mobile stop part, wherein the first spacer piece protrudes from the first main body in the direction of the spindle longitudinal axis L3 towards the second end, and the first spacer piece comprises a proximal end section, a distal end section and a connection piece which connects the same, and wherein the first stop device includes:

at the proximal end portion a proximal mobile stop part, which extends radially from the first stop device with respect to the spindle longitudinal axis L3;

at the distal end portion a distal mobile stop part, which extends radially from the first stop device with respect to the spindle longitudinal axis L3;

wherein the second stop device comprises a second spacer piece and a complementary stop part.

13. The linear adjuster according to claim 12, wherein the second spacer piece protrudes from the second main body in the direction of the spindle longitudinal axis L3 towards the first end, and wherein the second spacer piece comprises a connection section, which is non-rotatably connected to the second main body, a stop section and a connection piece connecting the same.

14. The linear adjuster according to claim 12, wherein, in the stop provisioning state, the first stop device is arranged on the first main body in a mechanically fixed or locked manner by which its position and orientation is fixed in a mechanically fixed or fixed manner by means of the fixation device, and wherein, in order to achieve the stop release state, the fixation device is released and the first stop device is mechanically released for a movement away from the first main body in relation to the spindle axis radially outward into the stop release state.

15. The linear adjuster according to 12, wherein the first stop device is clamp-like.

16. The linear adjuster according to claim 12, wherein the fixation device is formed at the proximal end portion.

17. The linear adjuster according to claim 12, further comprising a positioning device.

* * * * *